(12) United States Patent
Zimmermann

(10) Patent No.: US 8,364,289 B2
(45) Date of Patent: Jan. 29, 2013

(54) METHOD AND APPARATUS FOR MOVING A FREE-SWINGING LOAD FROM A STARTING POINT TO A TARGET POINT

(75) Inventor: Uwe Zimmermann, Augsburg (DE)

(73) Assignee: Kuka Roboter GmbH, Augsburg (DE)

(*) Notice: Subject to any disclaimer, the term of this patent is extended or adjusted under 35 U.S.C. 154(b) by 677 days.

(21) Appl. No.: 12/514,138

(22) PCT Filed: Nov. 8, 2007

(86) PCT No.: PCT/EP2007/062074
§ 371 (c)(1),
(2), (4) Date: Nov. 17, 2009

(87) PCT Pub. No.: WO2008/055956
PCT Pub. Date: May 15, 2008

(65) Prior Publication Data
US 2010/0094464 A1     Apr. 15, 2010

(30) Foreign Application Priority Data
Nov. 9, 2006   (DE) .......................... 10 2006 052 956

(51) Int. Cl.
*G05B 19/18*   (2006.01)
*B66C 13/06*   (2006.01)

(52) U.S. Cl. ............. 700/63; 700/61; 212/270; 212/272

(58) Field of Classification Search ............... 700/61, 700/63, 213, 275, 280; 701/50; 212/270, 212/272–276; 198/465.4
See application file for complete search history.

(56) References Cited

U.S. PATENT DOCUMENTS

| 4,997,095 A |   | 3/1991 | Jones et al. |
| 5,799,805 A | * | 9/1998 | Mard et al. ..................... 212/270 |
| 7,497,321 B2 | * | 3/2009 | Matsubara et al. ........ 198/465.4 |

FOREIGN PATENT DOCUMENTS

| EP | 0 562 124 |   | 10/1992 |
| EP | 1314681 A1 | * | 5/2003 |
| JP | 02132097 |   | 5/1990 |
| JP | 11240687 |   | 9/1999 |
| JP | 11301969 |   | 11/1999 |

* cited by examiner

Primary Examiner — Charles Kasenge
Assistant Examiner — Steven Garland
(74) Attorney, Agent, or Firm — Schiff Hardin LLP

(57) ABSTRACT

In a method and apparatus for moving a free-swinging load that is suspended relative to a suspension point, a first path along which the load should be moved from a starting point to a destination, with a first location-dependent velocity, is provided to a processor. In the processor, a second path is automatically determined along which the suspension point should be moved with a second location-dependent velocity to cause the load to move along the first path from the starting point to the destination with the first location-dependent velocity. A movement-imparted mechanism, connected to the suspension point, is automatically controlled from the processor to move the freely-suspended load from the starting point to the destination by moving the suspension point along the second path with the second location-dependent velocity.

14 Claims, 4 Drawing Sheets

METHOD AND APPARATUS FOR MOVING A FREE-SWINGING LOAD FROM A STARTING POINT TO A TARGET POINT

BACKGROUND OF THE INVENTION

1. Field of the Invention

The present invention concerns a method and a device for moving a free-swinging load from a starting point to a destination.

2. Description of the Prior Art

A robot can transport a load that is free-swinging relative to a suspension point of the robot, for example in the field of material handling or in the field of logistics. The load can be set into oscillations, for example due to accelerations during the transport, such that this in particular is still swinging when the robot or the suspension point has reached its destination. A targeted depositing of the load immediately after reaching the destination is thereby at least hindered or entirely impossible. The robot can wait until the load has a sufficiently low oscillation in order to enable a targeted depositing.

In order to attenuate oscillations of the load during the transport, DE 42 38 795 A1 discloses to arrange a rotation axis sensor or acceleration sensor near a pendulous load to measure the angular velocity or the angle of inclination of the load relative to a coordinate system fixed relative to the surface of the earth. Due to the measured, current angular velocity of the load, its suspension point or the length of a cable with which the load is suspended freely swinging at the suspension point is varied to damp the oscillation. A relatively complicated regulation with a feedback loop for the suspension point is thus realized based on the measured values of the rotation axis sensor or acceleration sensor, the performance of which regulation in particular depends on the quality of the sensor signals.

DE 102 23 670 A1 discloses a method for operating a robot that comprises a gripping tool connected with a hand of the robot. The robot can lift an object with the gripping tool and transport it from a starting point to a destination. In order to avoid the object tearing away from the gripping tool caused by accelerations during the transport of the object, during the transport of the object the robot rotates its hand such that essentially only normal forces act between the object and the gripping tool. However, the object is not freely suspended during the transport but rather is firmly connected with the hand via the gripping tool so that, via the rotation of the hand, the object is brought into the position established according to the rotation during its transport.

SUMMARY OF THE INVENTION

It is an object of the present invention to execute an improved method and an improved device for the movement of a free-swinging load from a starting point to a destination such that the load reaches the destination optimally free of oscillation.

The object is achieved by a method for moving a free-swinging load, which includes the following method steps:

establish a first path on which a load should be moved from a starting point to a destination with a first location-dependent velocity, wherein the load is suspended freely at a predetermined distance relative to a mobile suspension point, determine a second path on which the suspension point should be moved with a second location-dependent velocity such that the load moves along the first path from the starting point to the destination with the first location-dependent velocity, and move the suspension point at which the load is freely suspended along the determined second path with the second location-dependent velocity.

According to the method according to the invention, the load should be moved from the starting point to the destination on the first path. As used herein, the term "path" (which is also designated as a trajectory), is generally understood as meaning a spatial curve along which a body or its center of gravity moves with a specific, location-dependent velocity.

In contrast to the method disclosed in DE 102 23 670 A1, in the method according to the invention the load is fastened freely oscillating at a predetermined distance relative to the suspension point. The load freely swinging relative to the suspension point thus constitutes a pendulum with a constant pendulum length that corresponds to the distance between the load and the suspension point. For example, the load is movably suspended at a predetermined distance at the suspension point by a cable, a chain or a rod. If the load is deflected from its vertical rest position, it swings back under the influence of gravity. The load can also be set into oscillation by an acceleration during the movement along the first path.

So that the load is moved from the starting point to the destination along the predetermined first path, the suspension point relative to which the load is attached in a free-swinging manner must move on the second path. This is determined according to the invention, for example before or during the movement of the load, to cause the load to move along the first path during its movement. If this is the case then no forces act transversely to the connection distance between the load and the suspension point, which is why the load cannot be set into oscillation during its movement and accordingly arrives at its destination free of oscillation.

In an embodiment of the method according to the invention, the second path can be determined according to the following method steps:

determine the accelerations acting on the load during the movement from the starting point to the destination of the load along the first path due to the current velocities of the load during the movement and due to the mass of the load, determine angular positions of the load relative to the suspension point due to the determined accelerations and determine the second path by determining those positions of the suspension positions of the suspension point in space so that the load exhibits the determined angular positions relative to the suspension point during the movement.

Both the length of the connecting segment between the load and the suspension point and the current position of the load during the planned movement along the first path are known. The position of the suspension point in space relative to the current position of the load can thus be calculated by means of the calculated angular position. If this calculation is conducted for each position of the load during its movement along the first path, this yields the second path.

If the angular positions of the load are determined relative to the suspension point in a Cartesian coordinate system with the horizontal coordinates x and y and the vertical coordinate z, the angular positions can then be determined according to a variant of the method according to the invention according to the formulas:

$$\theta_x(t) = \text{Arctan}\left(\frac{a_x(t)}{g + a_z(t)}\right)$$

$$\theta_y(t) = \text{Arctan}\left(\frac{a_y(t)}{g + a_z(t)}\right)$$

wherein $a_x$, $a_y$ and $a_z$ are the accelerations of the load with regard to the x-coordinate, the y-coordinate and the z-coordinate and g is the acceleration due to gravity.

The method according to the invention proceeds from the following through experiment illustrated in FIGS. 1 and 2:

At a suspension point 1 of a manipulator (for example a flange F of a robot), a support tray 2 (shown in FIG. 1) is mounted at a location A in horizontal alignment with and at a predetermined distance L from the suspension point 1. The support tray 2 is not mounted free-swinging relative to the suspension point 1 or, respectively, the flange F and can be tilted relative to the suspension point 1 by rotating the flange F.

At a location A, a load 3 with a mass m is now placed on the support tray 2, centrally below the suspension point 1. For the thought experiment, the load 3 should now be transported horizontally from location A to a location B with the support tray 2.

During the transport of the load 3 (thus during the movement of the load 3 from location A to the location B along a spatial curve 4) a resulting force $F_R$ acts on the load 3 at every point of the spatial curve 4, as this is illustrated in FIG. 2. The resulting force $F_R$ is composed of an inertial force $F_a$ and the force of gravity $F_g$ of the load 3. The inertial force $F_a$ arises due to an acceleration a dependent on the movement and acts in a horizontal direction, and the force of gravity $F_g$ hearkens back to the acceleration g due to gravity and acts in a vertical direction.

It is now possible to tilt the support tray 2 such that the resulting force $F_R$ affecting the load 3 possesses only one normal component $F_N$, meaning that the resulting force $F_R$ acts only in the direction of the connecting segment 5 between the load 3 and the suspension point 1, and thus the resulting force $F_R$ is aligned at a right angle to the support tray 2. In order to achieve this condition, the support tray 2 must be tilted by a tilt angle θ between the connecting segment 5 and the alignment of the force of gravity $F_g$, as this is illustrated in FIG. 2.

If a Cartesian coordinate system with the horizontal coordinates x and y and the vertical coordinate z is assumed as a basis, the tilt angle θ has an angular component $\theta_x$ with regard to the x-coordinate and an angular component $\theta_y$ relative to the y-coordinate. The two angular components are then calculated as follows:

$$\theta_x(t) = \text{Arctan}\left(\frac{a_x(t)}{g + a_z(t)}\right)$$

$$\theta_y(t) = \text{Arctan}\left(\frac{a_y(t)}{g + a_z(t)}\right)$$

wherein $a_x(t)$ is the horizontal acceleration component of the acceleration a(t) (due to the movement of the load 3) acting in the x-direction, $a_y(t)$ is the horizontal acceleration component acting in the y-direction and $a_z(t)$ is the vertically acting acceleration component.

If, during the movement of the load 3, the support tray 2 is always tilted corresponding to the conditions just stated, no transversal forces act on the load 3 relative to the support tray 2, and the load 3 does not move relative to the support tray 2.

If the load 3 is now attached to the suspension point 1 freely suspended at a distance L, this essentially results in a pendulum with a pendulum length equal to the distance L and the mass m of the load 3. If, within the scope of the thought experiment, an observer is "placed" in the accelerated reference system of the support tray 2, the following can be observed: no transversal forces act on the pendulum or on the load 3 and the observer relative to the support tray 2. To the observer the pendulum or the load 3 appears to stand still. Since the support tray 2 also comes to stand horizontally again at the destination (location B), the pendulum or the load 3 will likewise be located at rest at the destination (location B).

The method according to the invention causes the free-swinging load 3 to arrive essentially free of oscillation (relative to the suspension point 1) at the destination (location B). This applies not only for horizontally traveling first paths but also for arbitrarily travelling first paths. The first path can accordingly exhibit only horizontal movement components (as this is the case for the thought experiment) or horizontal and vertical movement components relative to the surface of the earth.

In contrast to conventional methods, the movement of the suspension point according to the invention is not regulated, whereby the current real status of the load during its movement does not need to be determined during the movement. No sensor technology is needed for the method according to the invention.

The determination of the second path on which the suspension point moves, in particular from the accelerations of the translational movement of the load, can be executed with less complexity than typical multivariable regulation. This has a positive effect on the required computing power for the determination of the second path.

The aforementioned object also is achieved by a device in accordance with the invention for moving a free-swinging load, having:

a support device for free-swinging suspension of a load relative to a suspension point,
   an input device to input the course of a first path on which the load (attached free-swinging to the support device) should move from a starting point to a destination with a first location-dependent velocity,
   a movement-imparting mechanism for movement of the support device in at least three degrees of freedom,
   a control device that controls the movement-imparting mechanism for movement of the support device such that the support device moves with a second, location-dependent velocity on a second path predetermined by the control device, and
   a computer that calculates the course of the second path based on the first path such that the load moves along the first path from the starting point to the destination.

The method according to the invention can be implemented with the device according to the invention (which can be a robot, for example).

The first path for the load to be moved can be input with the input device, for example a keyboard, a mouse or a touchscreen. Alternatively, the first path can also be calculated by the computer (automatic path calculation). Based on the course of the desired first path, the computer (or, respectively, a suitable calculation program running on the computer) calculates the second path essentially according to the method according to the invention.

The support device for the free-swinging load is, for example, a robot flange that is moved on the calculated second path by the movement-imparting mechanism in order to move the load. The movement-imparting device is controlled by the control device (which is a computer, for example).

According to one embodiment of the device according to the invention, the computer is configured (programmed) to calculate accelerations acting on the load during the movement from the starting point to the destination of the load along the first path due to the current velocities of the load during the movement, determines angular positions of the load relative to the suspension point based on the calculated accelerations, and calculates the second path by determining those positions of the suspension point in space, such that the load exhibits the determined angular positions relative to the suspension point during the movement.

The computer can determine the angular positions of the load relative to the suspension point in a Cartesian coordinate system with the horizontal coordinates x and y and the vertical coordinate z, according to the following formulas:

$$\theta_x(t) = \text{Arctan}\left(\frac{a_x(t)}{g + a_z(t)}\right)$$

$$\theta_y(t) = \text{Arctan}\left(\frac{a_y(t)}{g + a_z(t)}\right)$$

wherein $a_x$, $a_y$ and $a_z$ are the accelerations of the load relative to the x-coordinate, the y-coordinate and the z-coordinate, and g is the acceleration due to gravity.

According to variants of the device according to the invention, this device is operated such that the first path has only horizontal movement components, or horizontal and vertical movement components relative to the surface of the earth.

A coordinate system that lies in the center of the flange is designated as what is known as a tool center point (TCP) of the robot. Due to the three degrees of freedom, the TCP can be moved translationally in space in the three spatial directions X, Y and Z, corresponding to the coordinates x, y and z. Moreover, the flange can also normally be turned rotationally in the three orientations C, B and A around the spatial directions X, Y and Z. The three spatial directions and the three orientations form what are known as the poses of the flange or the TCP.

An advantage of the method according to the invention and the device according to the invention is that only the three spatial directions of the TCP are relevant to the determination of the second path, and the orientations C, B and A have no influence. This allows a relatively simple and relatively quick determination or calculation of the second path.

The movement-imparting mechanism for movement of the support device in the device according to the invention can have four, five, six or seven degrees of freedom.

In particular when the movement-imparting mechanism for movement of the support device has six degrees of freedom, a redundancy results relative to the suspension point. An example of a device of this variant according to the invention is a 6-axis robot. It is thus possible to determine optimization strategies (for example time optimization, avoidance of singularities or axis limitations) in the determination of the movement of the load since the determination of the two paths can ensue offline. This is not possible in conventional, regulation-based methods since these determine the robot movement online.

Since the behavior of the kinematics can be determined in advance of the actual movement implementation, a collision-free path planning is possible with the method according to the invention.

DESCRIPTION OF THE PREFERRED EMBODIMENTS

Figure 1:
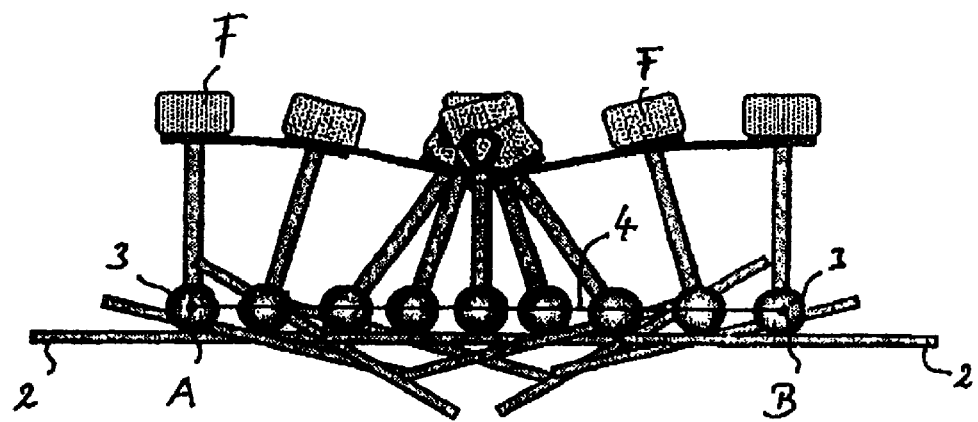
FIGS. 1 and 2 illustrate a scenario to describe the basic operation of the method and apparatus according to the present invention.
Figure 2:
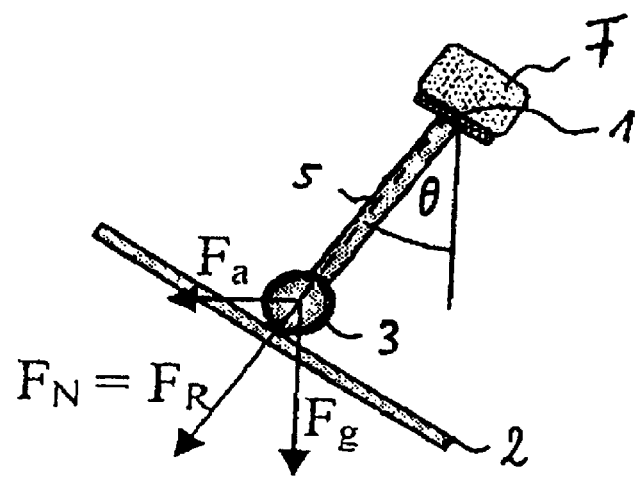

FIGS. 1 and 2 were already described in the preceding.

Figure 3:
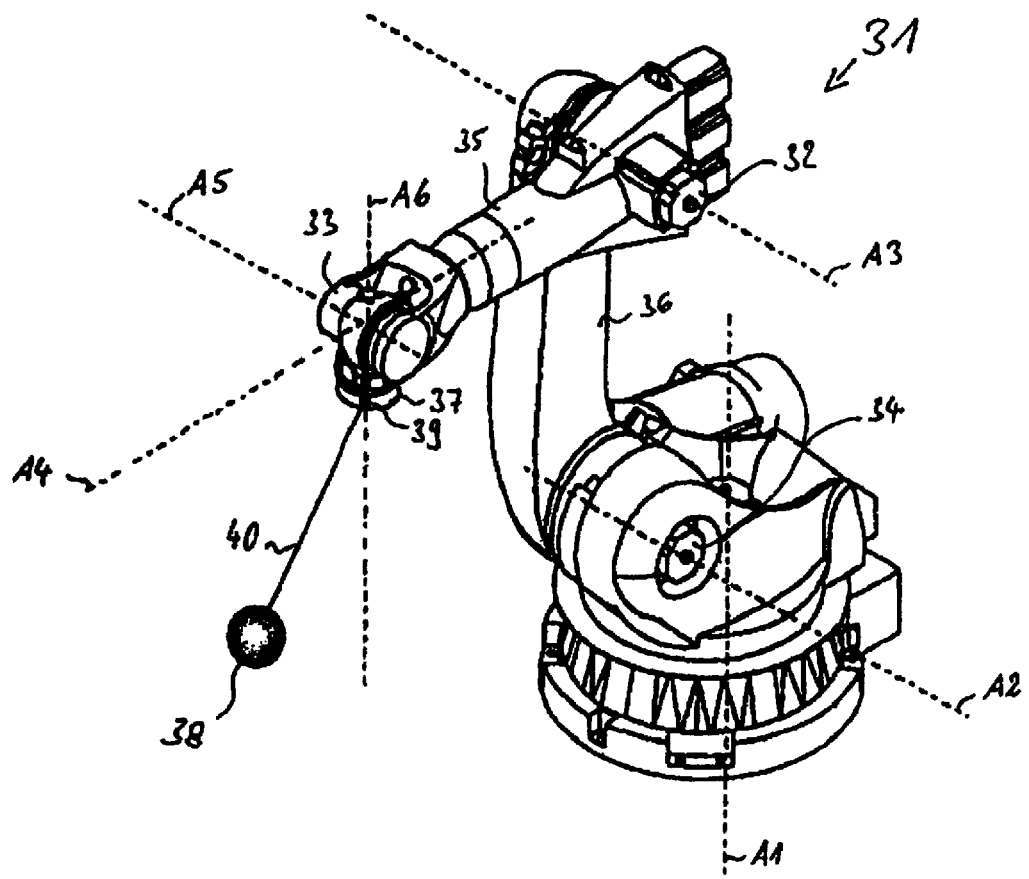
FIG. 3 shows a six-axis robot with a retention device for the free-swinging suspension of a load relative to a suspension point, suitable for use in accordance with the present invention.
Figure 3:
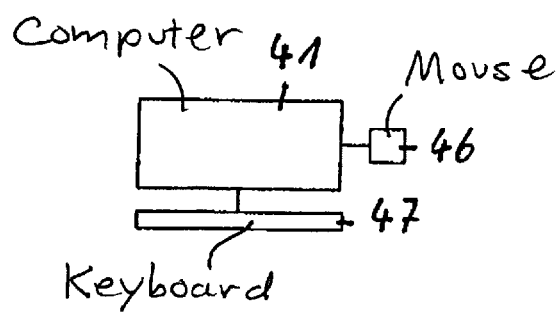

FIG. 3 shows a manipulation apparatus in the form of a 6-axis robot 31 with kinematics for movements in six degrees of freedom. The 6-axis robot 31 possesses (in a manner that is generally known) articulations 32 through 34, levers 35, 36 and actuators (not shown) as well as six movement axes A1 through A6. Furthermore, the 6-axis robot 31 has a support device 37 for the free-swinging suspension of a load 38 relative to a suspension point 39. In the exemplary embodiment, the load 38 is suspended freely swinging by means of a cable 40 at the support device 37. The cable 40 has a length L and the load 38 has a mass m.

Figure 4:
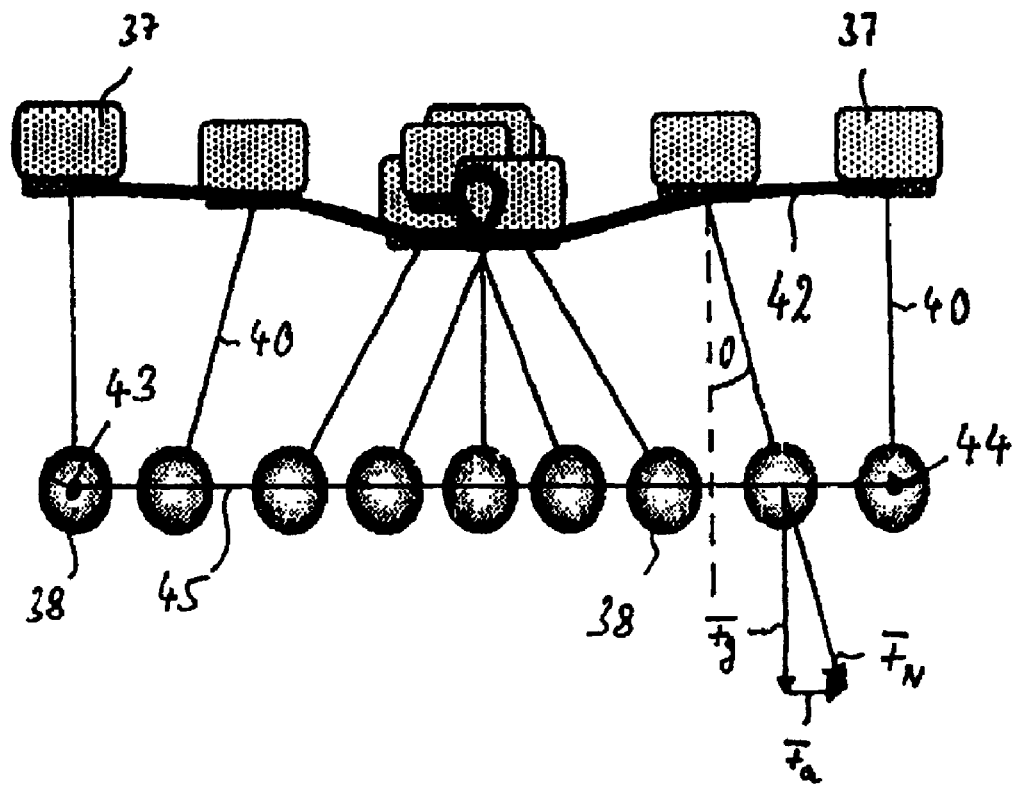
FIG. 4 schematically illustrates the path of the suspension point in accordance with the present invention.

The actuators (not shown)—which are electrical actuators, for example—are connected (in a manner that is not shown) with a computer 41 that controls the actuators such that the support device 37 or the suspension point 39 moves relative to a path 42 determined by means of the computer 41 (or by means of a computer program running on the computer 41) and shown in FIG. 4.

Figure 5:
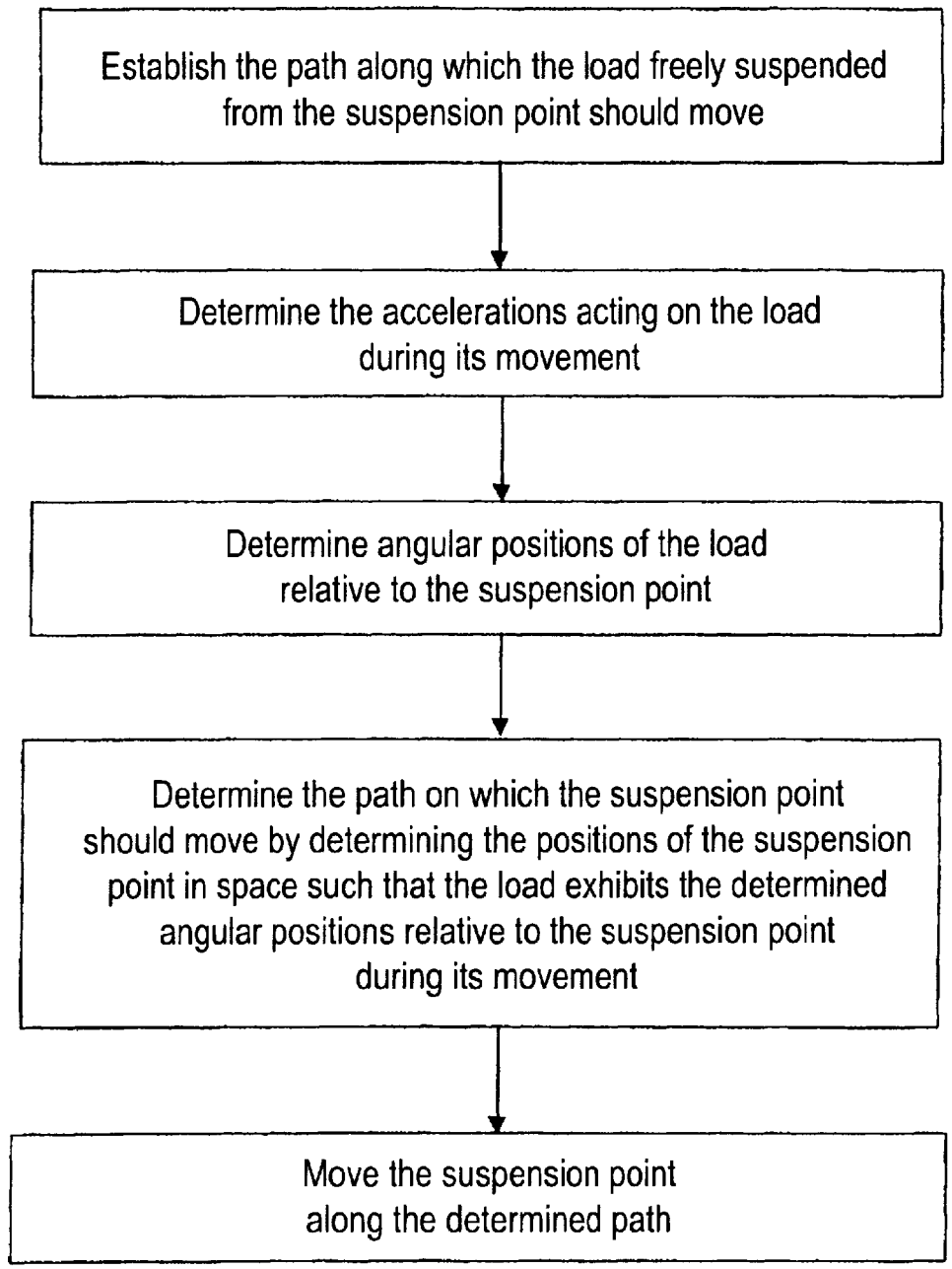
FIG. 5 is a flowchart of an embodiment of the inventive method.

The purpose of the 6-axis robot 31 is to move the free-swinging load 38 from a starting point 43 to a destination 44 along a path 45. The computer 41 (or, respectively, the computer program running on said computer 41) controls the actuators based on the path 45 of the load 38, such that the support device 37 moves on its path 42. In order to obtain the path 42 of the support device 37, in the exemplary embodiment an additional computer program that determines the path 42 of the support device 37 as follows runs on the computer 41. The determination of the path 42 is summarized by the flow chart shown in FIG. 5.

The course of the path 45 may be manually entered into the computer 41, for example by means of a mouse 46 or a keyboard 47 of the computer 41. Alternatively, the path 45 can be determined automatically. The path (also designated as a trajectory), is generally a spatial curve along which a body or its center of gravity moves with a defined, spatially dependent velocity. In the exemplary embodiment, the path 45 of the load 38 proceeds in one plane, but this is not absolutely necessary. The path 45 of the load 38 can also have a movement component directed upwards or downwards, as this would be required given raising of the load 38 over an obstacle (not shown), for example. The path 47 along which the load 38 should move from the starting point 43 to the destination 44 is thus established.

The computer program running on the computer 41 subsequently calculates the path 42 on which the support device 37 should move so that the load 38 moves on its path 45 from the starting point 43 to the destination 44.

In the exemplary embodiment, this is achieved by the computer program running on the computer 41 initially determining the accelerations acting on the load 38 during the movement from the starting point 43 to the destination 44 of the load 38 along its path 45 due to the current velocities of the load 38 during its movement. The accelerations of the load 38 result from the spatially dependent velocities of the load 38 during their movement along its path 45 and the acceleration g due to gravity.

The computer program running on the computer 41 subsequently determines those angular positions θ of the load 38 relative to the suspension point 39, based on the determined accelerations.

In the case of the present exemplary embodiment, the angular positions θ of the load 38 relative to the suspension point 39 in a Cartesian coordinate system with the horizontal coordinates x and y and the vertical coordinate z are determined according to the following formulas:

$$\theta_x(t) = \operatorname{Arctan}\left(\frac{a_x(t)}{g + a_z(t)}\right)$$

$$\theta_y(t) = \operatorname{Arctan}\left(\frac{a_y(t)}{g + a_z(t)}\right)$$

wherein $a_x$, $a_y$ and $a_z$ are the accelerations of the load 38 relative to the x-coordinate, the y-coordinate and the z-coordinate, and g is the acceleration due to gravity.

The computer program running on the computer 41 subsequently determines the path 42 on which the suspension point 39 or, respectively, the support device 37 should move from the determined angular positions θ of the load 38 during the movement of the load 38 on its path 45 and the length L of the cable 40, such that the load 38 moves on its path 42 from the starting point 43 to the destination 44.

The computer program running on the computer 41 subsequently controls the actuators such that the support device 37 or, respectively, the suspension point 39 moves along the determined path 42.

Although modifications and changes may be suggested by those skilled in the art, it is the intention of the inventor to embody within the patent warranted heron all changes and modifications as reasonably and properly come within the scope of his contribution to the art.

The invention claimed is:

1. A method to move a free-swinging load, comprising the steps of:
    suspending a load at a first end of a suspension element so as to freely swing from a movable suspension point at a second, opposite end of said suspension element, said suspension element having a fixed length between said suspension point and said load;
    establishing a first path along which the load is to be moved from a starting point to a destination with a first location-dependent velocity;
    in a processor supplied with a designation of said first path, automatically determining, for said fixed length of said suspension element, a second path along which the suspension point should be moved with a second-location dependent velocity to intentionally tilt said load on said suspension element relative to said suspension point so as to cause the load, suspended from said suspension point, to move along the first path from the starting point to the destination with said first location-dependent velocity and to arrive at said destination with substantially no oscillation at said destination; and
    automatically, non-manually controlling movement of the suspension point to move the suspension point along the determined second path with the second location-dependent velocity to move the load from said starting point to said destination.

2. A method as claimed in claim 1 comprising determining said second path in said processor by:
    determining accelerations acting on the load during movement from said starting point to said destination along said first path due to current velocities of the load during said movement;
    determining angular positions of the load relative to the suspension point due to the determined accelerations; and
    determining said second path by determining those positions of the suspension point in space that cause the load to exhibit the determined angular positions relative to the suspension point during said movement.

3. A method as claimed in claim 2 comprising determining the angular positions (θ) of said tilt of the load relative to the suspension point in a Cartesian coordinate system with horizontal coordinates x and y and a vertical coordinate z, according to:

$$\theta_x(t) = \operatorname{Arctan}\left(\frac{a_x(t)}{g + a_z(t)}\right)$$

$$\theta_y(t) = \operatorname{Arctan}\left(\frac{a_y(t)}{g + a_z(t)}\right)$$

wherein $a_x$, $a_y$, and $a_z$ are respective accelerations of the load with regard to the x-coordinate, the y-coordinate and the z-coordinate, and g is acceleration due to gravity.

4. A method as claimed in claim 1 comprising establishing the first path to include only horizontal movement components or horizontal and vertical movement components, relative to the surface of the earth.

5. An apparatus to move a free-swinging load, comprising:
    a movement-imparting mechanism having a suspension point, that is movable by the movement-imparting mechanism, from which a load is suspended at a first end of a suspension element, having a second, opposite end of said suspension element, said suspension element having a fixed length between said suspension point and said load, so as to freely swing from the suspension point;
    a processor in which a first path is established along which the load is to be moved from a starting point to a destination with a first location-dependent velocity;
    said processor executing software to automatically determine, for said fixed length of said suspension element, a second path along which the suspension point should be moved with a second-location dependent velocity to intentionally tilt said load on said suspension element relative to said suspension point so as to cause the load, suspended from said suspension point, to move along the first path from the starting point to the destination and to arrive at said destination with substantially no oscillation at said destination; and
    a control unit executing software automatically, non-manually control movement of the suspension point to move the suspension point along the determined second path to move the load from said starting point to said destination.

6. An apparatus as claimed in claim 5 wherein said processor is configured to determine said second path by:
   determining accelerations acting on the load during movement from said starting point to said destination along said first path due to current velocities of the load during said movement;
   determining angular positions of the load relative to the suspension point due to the determined accelerations; and
   determining said second path by determining those positions of the suspension point in space that cause the load to exhibit the determined angular positions relative to the suspension point during said movement.

7. An apparatus method as claimed in claim 6 wherein said processor is configured to determine angular positions ($\theta$) of said tilt of the load relative to the suspension point in a Cartesian coordinate system with horizontal coordinates x and y and a vertical coordinate z, according to:

$$\theta_x(t) = \mathrm{Arctan}\left(\frac{a_x(t)}{g + a_z(t)}\right)$$

$$\theta_y(t) = \mathrm{Arctan}\left(\frac{a_y(t)}{g + a_z(t)}\right)$$

wherein $a_x$, $a_y$, and $a_z$ are respective accelerations of the load with regard to the x-coordinate, the y-coordinate and the z-coordinate, and g is acceleration due to gravity.

8. An apparatus as claimed in claim 5 comprising establishing the first path in said processor to include only horizontal movement components or horizontal and vertical movement components, relative to the surface of the earth.

9. An apparatus as claimed in claim 5 wherein said movement-imparting mechanism comprises a plurality of degrees of freedom selected from the group consisting of four degrees of freedom, five degrees of freedom, six degrees of freedom and seven degrees of freedom.

10. An apparatus to move a free-swinging load, comprising:
    a movement-imparting mechanism having a suspension point, that is movable by the movement-imparting mechanism, from which a load is suspended at a first end of a suspension element, having a second, opposite end of said suspension element, said suspension element having a fixed length between said suspension point and said load, so as to freely swing from the suspension point;
    a processor executing software to establish a first path along which the load is to be moved from a starting point to a destination with a first location-dependent velocity;
    a control unit executing software to automatically, non-manually control movement of the suspension point to move the suspension point along a determined second path, derived from said first path, for said fixed length of said suspension element, with a second location-dependent velocity to move the load from said starting point to said destination with said first location-dependent velocity by intentionally tilting said load on said suspension element relative to said suspension point so as to cause said load to arrive at said destination with substantially no oscillation at said destination; and said processor executing software to determine said second path derived from the first path.

11. An apparatus as claimed in claim 10 wherein said processor is configured to derive said second path by:
    determining accelerations acting on the load during movement from said starting point to said destination along said first path due to current velocities of the load during said movement;
    determining angular positions of the load relative to the suspension point due to the determined accelerations; and
    determining said second path by determining those positions of the suspension point in space that cause the load to exhibit the determined angular positions relative to the suspension point during said movement.

12. An apparatus as claimed in claim 11 wherein said processor is configured to determine angular positions ($\theta$) of said tilt of the load relative to the suspension point in a Cartesian coordinate system with horizontal coordinates x and y and a vertical coordinate z, according to:

$$\theta_x(t) = \mathrm{Arctan}\left(\frac{a_x(t)}{g + a_z(t)}\right)$$

$$\theta_y(t) = \mathrm{Arctan}\left(\frac{a_y(t)}{g + a_z(t)}\right)$$

wherein $a_x$, $a_y$, and $a_z$ are respective accelerations of the load with regard to the x-coordinate, the y-coordinate and the z-coordinate, and g is acceleration due to gravity.

13. An apparatus as claimed in claim 10 wherein said processor is configured to establish said first path so as to include only horizontal movement components or horizontal and vertical movement components, relative to the surface of the earth.

14. An apparatus as claimed in claim 10 wherein said movement-imparting mechanism comprises a plurality of degrees of freedom selected from the group consisting of four degrees of freedom, five degrees of freedom, six degrees of freedom and seven degrees of freedom.

* * * * *